Figure 1:
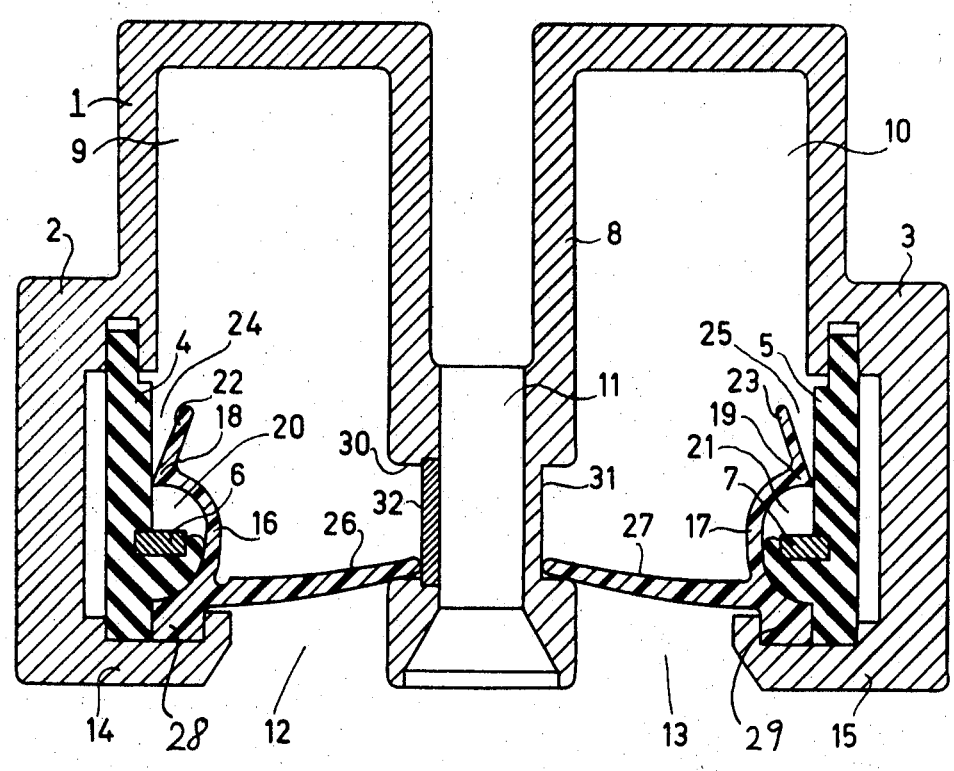

United States Patent

[11] 3,569,899

| [72] | Inventor | Max Laser |
| | | Lidingo, Sweden |
| [21] | Appl. No. | 797,567 |
| [22] | Filed | Feb. 7, 1969 |
| [45] | Patented | Mar. 9, 1971 |
| [73] | Assignee | U.S. Philips Corporation |
| | | New York, N.Y. |
| [32] | Priority | Feb. 9, 1968 |
| [33] | | Sweden |
| [31] | | 1761/68 |

[54] DEVICE IN DISTRIBUTION SYSTEMS FOR ELECTRIC CURRENT
10 Claims, 5 Drawing Figs.

[52] U.S. Cl. .................................................. 339/14, 339/21, 339/176
[51] Int. Cl. ............................................... H01r 41/00
[50] Field of Search ........................................... 339/14, 21, 22, 23; 191/23, 23 (A)

[56] References Cited
UNITED STATES PATENTS

| 2,170,299 | 8/1939 | Frank | 339/21 |
| 2,230,658 | 2/1941 | Stull | 339/21 |
| 3,081,442 | 3/1963 | Platz | 339/14 |
| 3,181,102 | 4/1965 | Fehr, Jr. | 339/21 |

FOREIGN PATENTS

| 517,318 | 1/1940 | Great Britain | 339/23 |

Primary Examiner—Marvin A. Champion
Assistant Examiner—Patrick A. Clifford
Attorney—Frank R. Trifari

ABSTRACT: A hollow supply rail having a current carrier therein for the distribution of electrical current. The rail has a side slit opening through which a contact device may be inserted for tapping into the carrier. The carrier is made accessible from a direction opposite to the slit opening so as to be available only to the hook-shaped contact device.

INVENTOR
MAX LASER
BY
AGENT

Patented March 9, 1971

3,569,899

5 Sheets-Sheet 4

INVENTOR.
MAX LASER
BY
AGENT

Patented March 9, 1971

3,569,899

5 Sheets-Sheet 5

INVENTOR
MAX LASER

BY
AGENT

DEVICE IN DISTRIBUTION SYSTEMS FOR ELECTRIC CURRENT

The invention refers to a device in distribution systems for electric current of the type which have a supply rail in the shape of an elongated hollow profile having at least one slit shaped opening in one of the sidewalls of the profile and a current bar mounted on an insulating carrier within the profile between the opening and an adjacent sidewall of the profile, which supply rail is adapted to cooperate with a contact device provided with contact means which are introduced into the said opening so that the contact means will come in touch with the current bar.

Such distribution systems can be used for illumination armatures and small apparatuses in exhibition and industry locals and in all cases where it is required to have an illumination or electrical apparatuses which are to be adapted to the actual need. The supply rails can be mounted in the ceiling, on the walls near the floor and possibly within the floor. Armatures and cables can be connected directly to the contact device which is introduced at a suitable place in the system. Current supply to the current bars can be effected by means of special connection devices situated at one end of each rail or alternatively through the same type of the contact device which is used for current tapping.

A problem in such systems is the need to meet safety requirements to protect against unintentional contact with the current bars. The current bars in one known system are surrounded by insulating material and the contact is adapted to project through the insulation at the contact point. Such a system does not meet the necessary safety demands since the insulation will, after some use, develop a number of holes, through which the current bars will be left exposed. In other proposed systems the input openings of the supply rails are covered by elastic strips, which are pushed away by the contact device upon its introduction into the opening. This system also falls short of meeting the safety requirements, as the protective strips will be easily pushed away be any metallic object which may be inserted in the opening and which may make contact with the current bars.

According to the invention the current bars situated within the hollow profile are concealed and protected by an insulating protecting strip extending along one sidewall of the profile adjacent to the opening and connected to the rail in the vicinity of the opening and connected to the rail in the vicinity of the opening so that it forms a space extending along the rail, in which space the current bar is arranged. The space is only accessible from the side opposite the opening for the end portion of a hook shaped contact means of an electrical contact device inserted through the opening.

The protecting strip of insulation can suitably be elastic. A portion of it will bear against the insulating carrier body supporting the current bar or the profile, respectively, so that the current bar will be situated in a substantially closed space. The protecting strip has end portion, which extends inwardly and forms a substantially V-shaped introduction slot for facilitating the introduction of the hook shaped part of the contact means behind the protecting strip.

In a supply rail which is protected by being grounded or provided with a grounded current bar, the contact device can further be provided with separate contact means which will come in contact with the profile or the grounded current bar immediately upon the introduction of the contact device onto the supply rail. In view of the fact that the contact means cooperating with the current supply bar must be displaced before it will make contact with the bar, the present invention provides a simple way to ensure that the grounding will always occur before the connection to the current supply bar.

Figure 2:
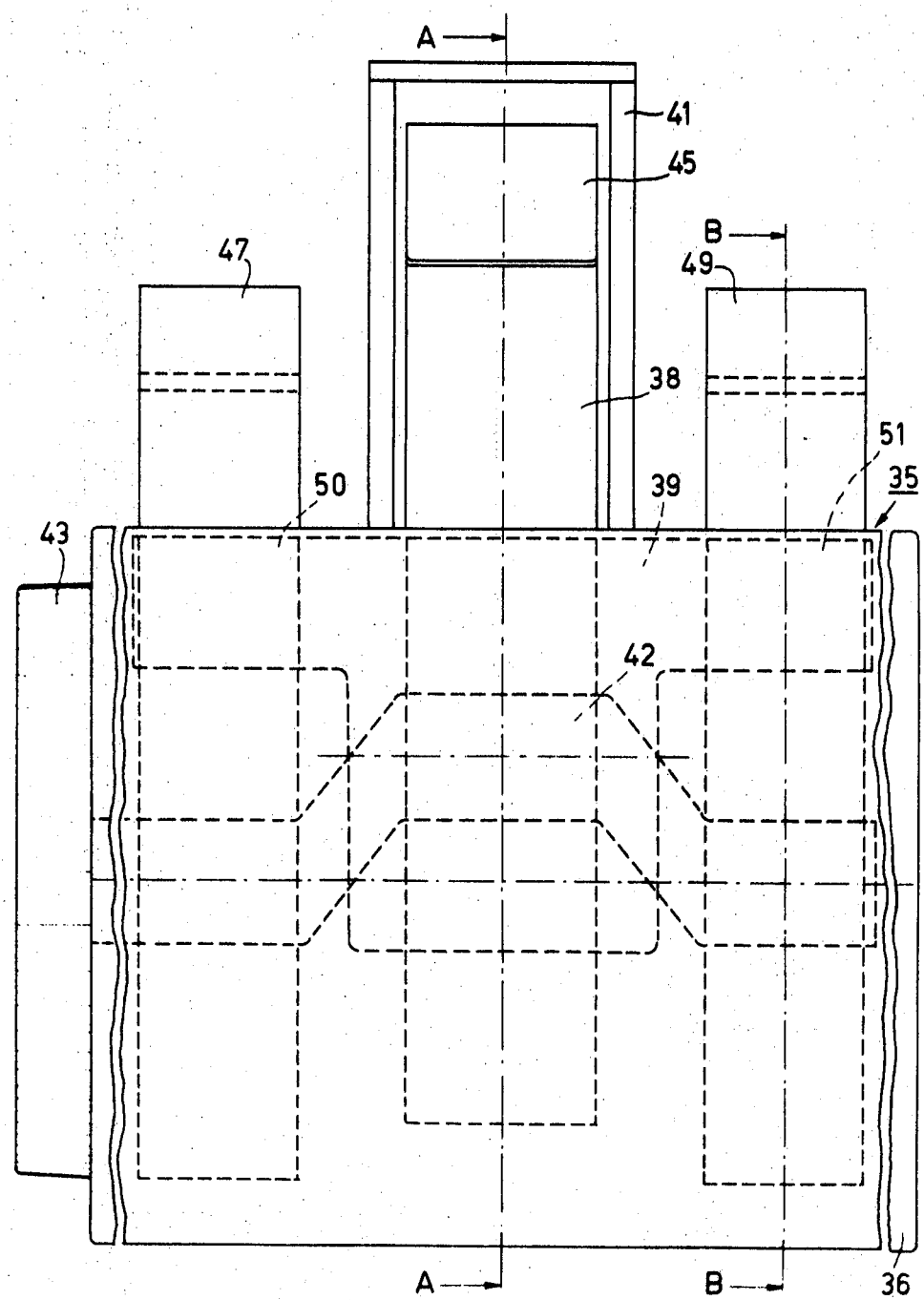
Figure 3:
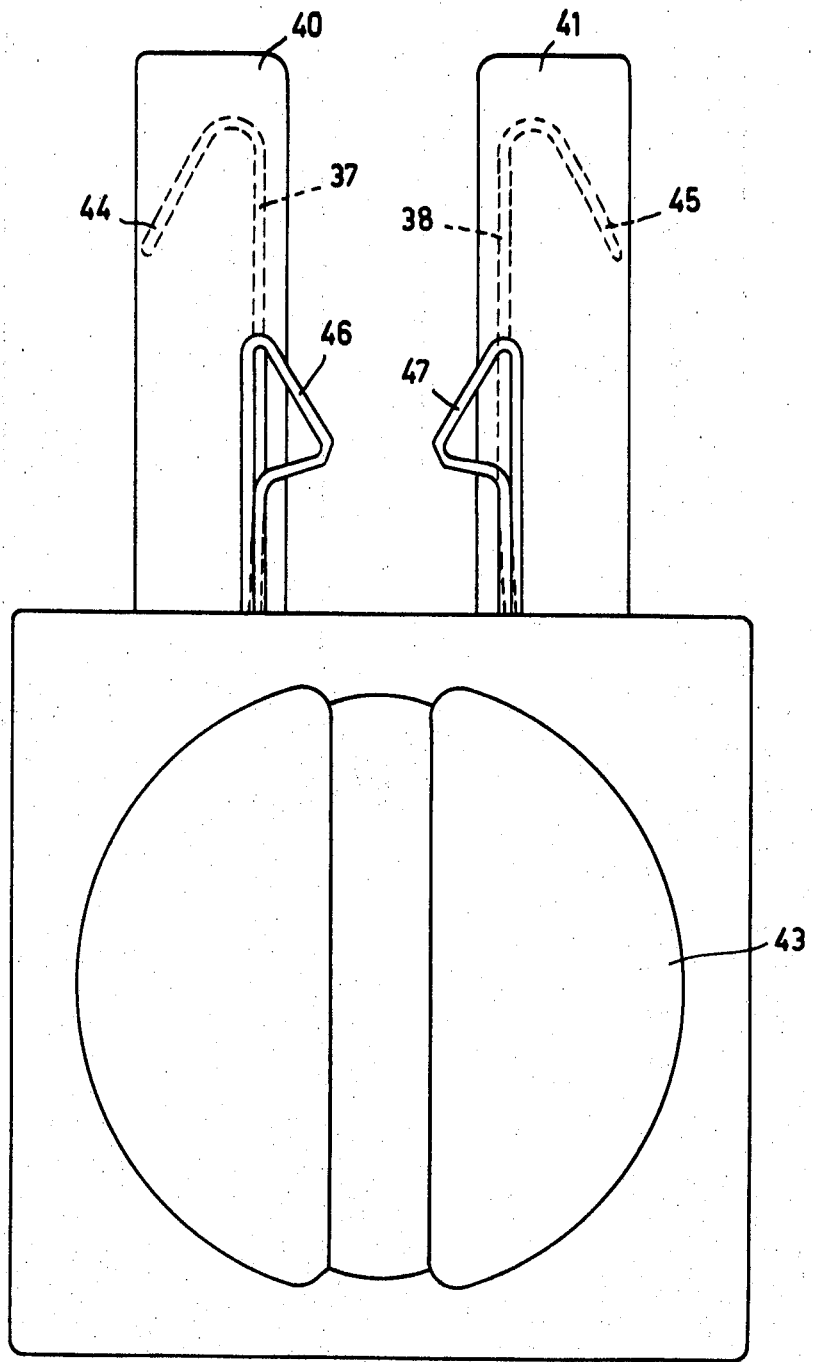
Figure 4:
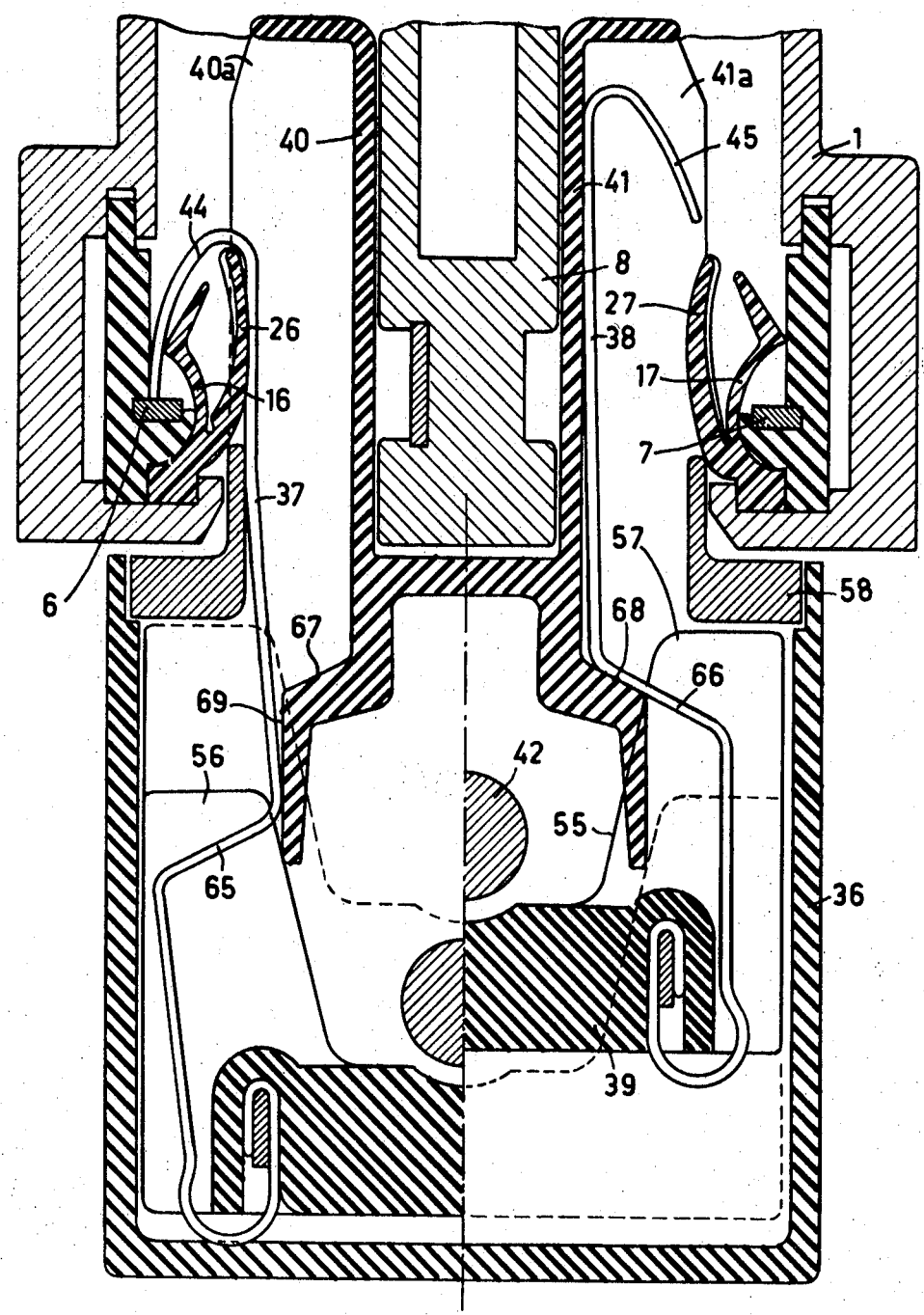
Figure 5:
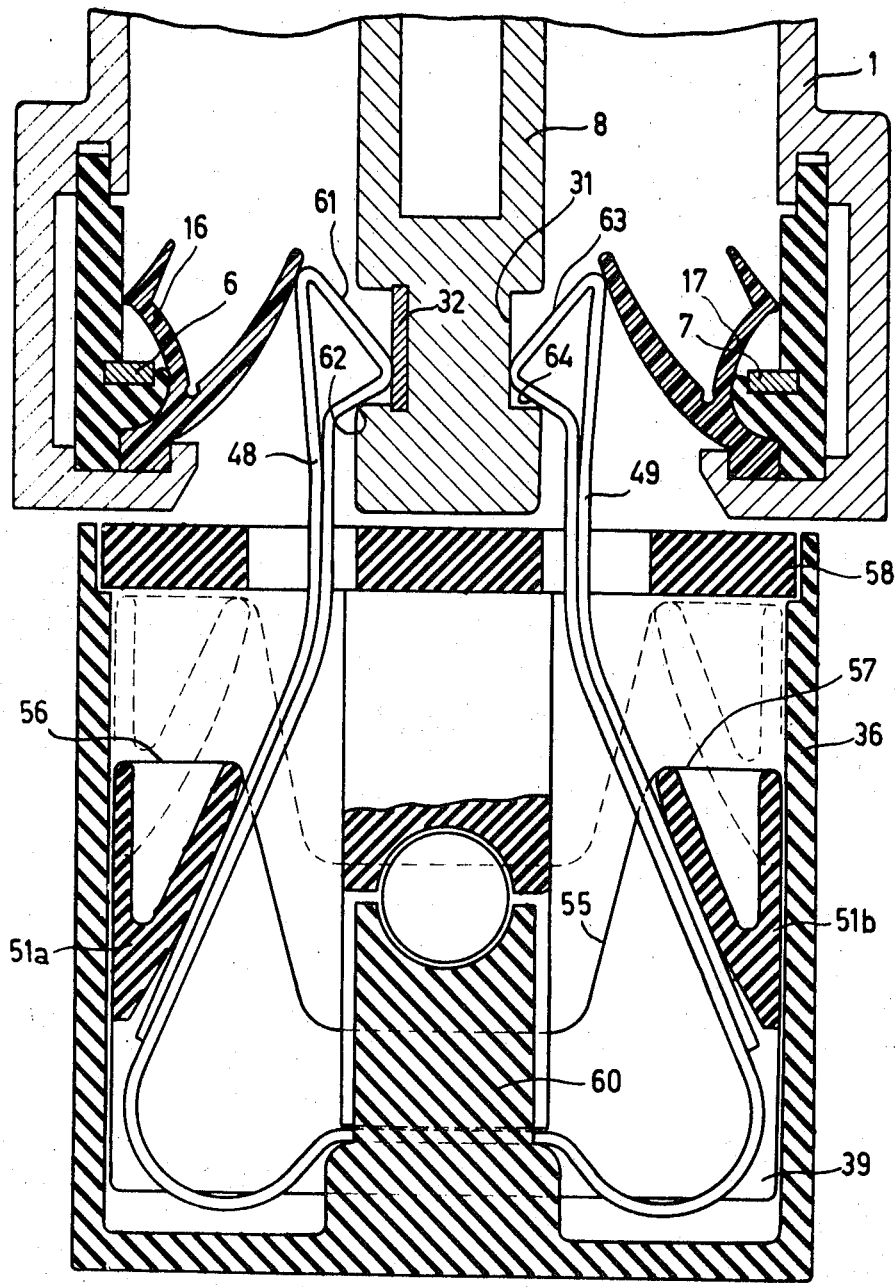

The invention is illustrated in the accompanying drawings, in which:

FIG. 1 shows a sectional view through a supply rail shaped according to the invention, FIGS. 2 and 3 show a side view and an end view respectively of a contact device adapted to be introduced on the supply rail according to FIG. 1, FIG. 4 shows a sectional view through the contact device as introduced upon the rail, taken along line A-A in FIG. 2, and FIG. 5 shows another sectional view through the contact device, taken along line B-B in FIG. 2.

The supply rail shown in FIG. 1 consists of a substantially rectangular hollow profile 1, which at opposite sidewalls has projecting portions 2, 3, in which insulating carrier bodies 4, 5 for current bars 6, 7 are arranged. A center bar 8 divides the inner of the profile in two parts, so that the current bars are situated in separate rooms 9, 10. Holes 11 extending through the center bar are adapted for screws by means of which the rail can be fixed to a base. On opposite sides of the center bar there are slit shaped openings 12, 13 formed between the center bar and portions 14, 15 of the profile serving as holder for the insulating carrier bodies 4, 5.

The current bars 6, 7 are according to the invention protected by means of insulating, elastic protecting strips 16, 17, which extend from the opening inwardly into the inner of the profile beyond the place, where the current bars 6, 7 are situated. The protecting strips 16, 17 have a portion 18, 19 which bears against the insulating body 4, 5 so that the current bars are situated each in a closed space 20, 21. The insulating protecting strips are terminated inwardly by end portions 22, 23, which form an angle with the insulating carrier bodies, so that inwardly open, V-formed slits 24, 25 are formed between the end portions of the protecting strips and the insulating carrier bodies. Furthermore protecting strips 26, 27 are arranged for covering the opening 12 and 13 respectively. The protecting strips 26, 27 can suitably as shown be made integral with the strips 16, 17 and have a common base 28, 29, which is squeezed between the carrier bodies 4, 5 and the holder portions 14, 15 of the profile.

The center bar is furthermore provided with longitudinal recesses 30, 31, one of which comprises an earthed current bar 32.

The profile 1 can consist of aluminum and be manufactured by extrusion. The protecting strips 16, 17 and 26, 27 consist suitably of durable soft plastic material and the insulating carrier bodies 4, 5 can consist of thermo setting plastic material or ceramic material.

THe mounting can be carried through such that the insulating bodies 4, 5 which are only manufacture in short sections, are introduced from one end of the open profile 1, which is manufactured in long sections. The current bars 6, 7 which are of the same length as the profile sections, are thereafter introduced from the ends of the insulating bodies 4, 5. The base portions 28, 29 of the protecting strips are finally pressed from the side into the space between the insulating bodies 4, 5 and an inwardly projecting edge of the holder portions 14, 15.

A contact device which is adapted to cooperate with the described supply rail is shown in FIG. 2 and 3. More particularly FIG. 2 shows a side view of the contact device and FIG. 3 shows an end view of the device as seen from the left in FIG. 2.

The contact device, which is generally designated 35, consists of an insulating rectangular envelope 36, from which in the shown example three pairs of contact springs project. The contacts 37, 38 in the center contact pair, which form the current supply contacts, are mounted on a movable carrier 39 and bear against insulating supports 40, 41 projecting from the lid of the envelope 36. The carrier is displaced upwardly or downwardly by means of an eccentrically journaled shaft 42, which is rotated by means of a wheel 43. The contacts 37, 38 are terminated at their inner ends by hook shaped portions 44, 45.

The two outer contact pairs 46, 47 and 48, 49 respectively are fixedly mounted in the envelope and serve as grounding and holding means. The contacts are locked by the motion of the carrier 39 by means of arms 50, 51 projecting from the carrier, as will be more fully described hereinafter.

The detailed construction of the contact device 35 is shown in FIG. 4 and 5, which show different sectional view through the contact device while engaged with the supply rail. More particularly FIG. 4 shows a sectional view in the plane A-A and FIG. 5 shows a sectional view in the plane B-B.

As is best seen in FIG. 4, the carrier 39 is provided on its upper side with a longitudinal recess 55, where the eccentrically journaled shaft 42 is situated, and two on each side of the recess situated ridges 56, 57. The carrier 39 is influenced in direction upwardly by a compression spring (not shown). When the shaft 42 is in its upper position, the carrier will be pushed upwardly by the spring until the ridges 56, 57 bear against the lid 58 of the envelope 36. This position is shown to the right of the center line in FIG. 4. When the shaft 42 by rotation of the wheel 43 one half revolution has been brought to assume its lower position, it will press the carrier down against the action of the spring to a position, which is shown to the left of the centerline in FIG. 4.

The fixed contact springs 48, 49 are according to FIG. 5 mounted in a pillar 60 serving as bearing bracket for the shaft 42. The springs are heavily prestressed in direction against each other. The springs, at their outwardly projecting ends, provided with oblique surfaces 61, 62 and 63, 64, respectively, forming V-shaped holding means.

The corresponding is valid for the remaining fixed spring pair.

The contact springs supported by the movable carrier 39 are also prestressed in direction against each other, the prestress force being taken up by the supports 40, 41, which are provided with gable pieces 40a and 41a.

Before introduction of the contact device to the rail the wheel 43 is rotated such that the carrier 39 assumes its upper limit position, as shown by dotted lines in FIG. 5 and to the right of the centerline in FIG. 4. With the contact device in this condition the supports 40, 41 (FIG. 4) of the device are introduced through the openings 12, 13 on opposite sides of the center bar 8. As the contact device is further inserted the oblique guide surfaces 61, 63 of the contact springs 48, 49 (FIG. 5) will engage the center bar, whereby the contacts will be pushed away from each other. Immediately before reaching the stationary position the V-shaped portions of the contacts 48, 49 will engage the recesses 30, 31 in the center bar 8 in a snaplike manner. The contact spring 48 and thereby connected apparatuses will at the same time be connected to the grounded bar 32. The contact springs 37, 38 assume in this moment as mentioned their upper limit position, as is shown to the right of the centerline in FIG. 4, and bear against the supports 40 and 41 respectively. The shaft 42 is now rotated to its lower limit position by actuation of the wheel 43, whereby it will push the carrier 39 with the springs 37, 38 in a downward direction. During the first moment of the downwardly directed motion of the springs they will be bent outwardly due to the fact that oblique portions 65, 66 of the springs will engage guide surfaces 67, 68 situated on an inwardly projecting extension of the supports 40, 41. The springs will be kept in a bent position by sliding against guide surfaces 69, 70. As a result of the bending of the springs 37, 38 their hook shaped end portions 44, 45 will, during the continued motion downwardly, enter into the slots 23, 24 and will push the protection strip 16, 17 away. In the stationary position, when the shaft 42 has reached its lower limit position, the end of the hook shaped positions 44, 45 will bear against the respective current bar 6, 7.

The arms 50, 51 projecting from the carrier 39, as schematically shown in FIG. 2, consist according to FIG. 5 each of two wedge shaped bodies 51a, 51b which extend into the space behind the respective spring 48, 49. In the last phase of the downwardly directed motion of the carrier 39 the arms 51a, 51b will come in contact with the springs 48, 49 and will lock these springs and thereby the whole contact device in the shown position.

At demounting of the contact device the shaft 42 is returned to its upper limit position, whereafter the whole device is drawn out from the rail. The gable pieces 40a, 41a of the supports 40, 41 will during the whole time keep the strips 26, 27 beat inwardly, so that the hook shaped portions 44, 45 of the contacts 37, 38 will avoid engagement with the strips 26, 27 during the removal of the contact device.

Connection wires (not shown) are connected to the contact springs 37, 38 through flexible connection elements and a grounded wire is connected to the fixed contact springs 48, 49

I claim:

1. A device in systems for the distribution of electric current comprising an elongated supply rail having means for carrying electric current and a contact device for engagement with said supply rail, said supply rail comprising a hollow profile having at least one slit shaped opening in one of the sidewalls of the profile, a carrier of insulating material mounted within said profile and located between said opening and an adjacent sidewall of the profile, a current bar carried by said carrier, a first elastic insulating protecting strip mounted at its base within said profile in the vicinity of said slit and extending along said adjacent sidewall, said protecting strip having an end portion bearing against said carrier so as to form a closed space between said carrier and said first protecting strip, said current bar being located within said closed space, said protecting strip having a terminating leg extending from said end portion inwardly of said profile so as to form a V-shaped groove between said terminating leg and said carrier, said first protecting strip being movable away from said carrier by said contact device so as to render said current bar available for contact therewith, said closed space being approachable only from a direction opposite the direction of entrance through said opening into said hollow profile, a second elastic insulating protecting strip mounted within said hollow profile and extending away from said carrier so as to provide a protective covering over said slit opening, said contact device comprising hook shaped contact means for insertion into said slit shaped opening and having its contact ends located between the end portion of said first insulating protecting strips and said carrier so that said contact end of said contact means will penetrate the closed space for electrical contact engagement with said current bar when said contact means is moved in a direction opposite to the direction required for insertion of the contact device into the supply rail.

2. The device according to claim 1 wherein said V-shaped groove operates as means to guide said contact end of said hook shaped contact means into said closed space.

3. The device according to claim 2 wherein said second elastic insulating protecting strip is connected with said first protecting strip and wherein said second protecting strip will be moved away from said slit opening during insertion of said contact means through said slit opening.

4. The device according to claim 3 wherein said profile of said supply rail is provided with two current bars located at opposite walls of said profile and a center bar dividing said profile into two separate hollow compartments, said current bars being located in said separate hollow compartments of said profile, and each compartment being provided with one of said openings, each opening being located on the same wall of said profile and between said center bar and opposite walls, each compartment further comprising said carrier means for carrying said current bars, and first and second elastic insulating protecting strips.

5. The device according to claim 1 wherein said contact device comprises a housing of insulating material, a movable carrier mounted within said housing, said hook shaped contact means projecting into said profile being mounted on said movable carrier and means for causing movement of said movable carrier, whereby when said means for moving said carrier is activated said contact means will be displaced in a direction toward said opening so that said contact end will become located between said end portion of said first protecting strip and said current bar carrier so that said contact end is in electrical contact with said current bar.

6. The device according to claim 5 wherein said contact device further comprises guide surfaces for engaging said contact means so that as said contact means are displaced the contact end of said contact means will be caused to swing in a direction toward said V-shaped groove for guidance into said closed space for contact with said current bar and whereby said contact means are caused to swing to their initial position when being moved out of contact with said current bar.

7. The device according to claim 6 wherein said contact means is prestressed for causing said contact means to swing toward said V-shaped groove when said contact means is moved in a direction toward said opening for effecting contact with said current bar and for causing said contact means to swing away from said V-shaped groove when said contact means is moved away from said opening to effect disconnection from said current bar and withdrawal from said closed space.

8. The device according to claim 7 wherein said means for causing movement of said movable carrier comprises a shaft eccentrically mounted within said housing and connected to said movable carrier and a rotatable wheel extending beyond said housing so that said shaft will be caused to rotate and effect movement of said movable carrier when said wheel is turned.

9. The device according to claim 4 wherein said supply rail further comprises a grounded current bar and wherein said contact device further comprises fixed contact means for engagement with said grounded current bar, said fixed contact means being located on said housing for electrical contact with said grounded contact bar upon engagement of said contact device with said supply rail.

10. The device according to claim 9 wherein said grounded current bar is mounted on said center bar and wherein said fixed contact means engages said grounded current bar and said center bar, said fixed contacts being resiliently urged inwardly toward said center bar.